US006493293B1

(12) United States Patent
Gallery et al.

(10) Patent No.: US 6,493,293 B1
(45) Date of Patent: Dec. 10, 2002

(54) DISC CONTROLLING APPARATUS FOR DISPLAYING THE STATUS OF PLAYBACK INFORMATION

(75) Inventors: Richard D. Gallery, Dublin (IE); Alex De Bruyn, Leuven (BE)

(73) Assignee: Koninklijke Philips Electronics N.V., Eindhoven (NL)

( * ) Notice: Subject to any disclaimer, the term of this patent is extended or adjusted under 35 U.S.C. 154(b) by 166 days.

(21) Appl. No.: 09/621,274

(22) Filed: Jul. 20, 2000

(30) Foreign Application Priority Data

Aug. 14, 1999 (GB) .............................................. 9919188

(51) Int. Cl.7 ............................................. G11B 7/085
(52) U.S. Cl. .................................. 369/30.27; 369/47.22
(58) Field of Search .......................... 369/30.27, 30.24, 369/30.1, 30.11, 30.01, 47.22, 47.21

(56) References Cited

U.S. PATENT DOCUMENTS

| 5,056,071 A | 10/1991 | Gehringer et al. ............. 369/30 |
| 5,477,516 A | 12/1995 | Takezawa ..................... 369/48 |
| 5,576,909 A | 11/1996 | Dierkes et al. ........... 360/78.09 |
| 6,018,435 A * | 1/2000 | Uno et al. ................ 369/30.24 |

FOREIGN PATENT DOCUMENTS

EP         0768660 A1    4/1997

* cited by examiner

Primary Examiner—Tan Dinh
(74) Attorney, Agent, or Firm—Michael E. Belk

(57) ABSTRACT

In an optical or magnetic disc audio system, during conventional play the audio is decoded and played from the disc (RDISC) under the direction of a presentation control (PC) and the subcodes indicating time on the disc, track number and so forth are generated. Depending on the system hardware, for some speeds and directions (other than normal play) it may not be possible to decode real subcodes from the disc, and an emulator module (EMU) is switched in at these times. The emulator (EMU) plays a virtual disc (VDISC) using a timer (TIM) and the table of contents (TOC) from the real disc. While the audio is not replayed, the track and time listing display (DISP) is kept up to date, with a typical update for each second of real disc play time. As an extension to this feature, the emulator module (EMU) periodically generates seek commands for the read head in relation to the real disc (RDISC) such that, when normal playback is resumed, there is minimal delay in locating the chosen audio.

14 Claims, 2 Drawing Sheets

DISC CONTROLLING APPARATUS FOR DISPLAYING THE STATUS OF PLAYBACK INFORMATION

FIELD OF THE INVENTION

The present invention relates to reproducing apparatus for playing back data from a disc-shaped storage medium, particularly but not essentially audio data, and to such apparatus having means for displaying to a user data relating to the playback operation.

Players and recorders for storage discs, whether optical or magnetic (or a combination of both) are well known. At the mechanical level, these devices typically comprise a replay stage comprised of a spindle motor arranged to rotate a received disc at a controlled rate together with a traversal stage moving a read head across the tracks of the disc as it rotates. The discs, particularly but not exclusively those formatted according to CD Audio, CD-ROM, or DVD standards, carry a table of contents (TOC) which is read by the player on start-up and typically stored in local memory. The TOC identifies to the player where particular files are stored on the disc and enables the read head to be moved to access specific files or file segments.

One example of such a disc player is given in European patent application EP-A-0 768 660 in which, whilst the disc is being rotated, the target or desired address for the disc is compared with the actual read address to produce an error signal for compensating for linear velocity deviations.

Another example, in the form of a combined magnetic and optical disc reader, is described in U.S. Pat. No. 5,477,516. With this apparatus, a data stream is recorded on the disc in the form of discrete segments distributed across the disc. To enable fast seek and rewind functionality, the system described uses the TOC to build a linked list of the locations for the sequential parts of a file, with the system simply stepping through this list during high speed operation.

A typical feature of such disc players is a user display showing an identifier for the currently read file, together with ancillary data. In the case of an audio disc player, this identifier may comprise a track number and the ancillary data may comprise elapsed time for the track. This data is derived from subcodes in the file being read and by reference to the TOC.

SUMMARY OF THE INVENTION

A problem with such displays, however, arises during so-called trick-modes (fast forward/rewind) when the subcodes cannot generally be read fast enough and so the display cannot provide an accurate indication to the user of where the read head currently lies. The problem can also occur at slower speeds if the system is only configured to process the subcodes at one or just a limited range of preset speeds.

It is accordingly an object of the present invention to provide a disc reproducing apparatus having a user display the contents of which are kept up to date even at non-standard speeds.

In accordance with the present invention there is provided a disc reproduction apparatus comprising a disc replay stage operable to receive a disc and read data stored thereon, a controller coupled with the replay stage and a first storage means holding a table of contents for a received disc, and a display coupled to the controller, with the controller being configured to generate and periodically update for display an indication of data currently being read from a received disc based on indicator subcodes read from the disc and the table of contents; characterised in that the apparatus further comprises a time signal source coupled to the controller and the controller is arranged to generate and update an emulation model of a disc being read based at least partially on the table of contents and the time signal with the displayed indication of data being based instead on said emulation model when the indicator subcodes are unavailable. By providing the emulation model and periodically updating it (for example once per second of real disc play time) the display may be kept up to date even when the replay stage is in a fast seek mode during which subcodes cannot be read from the disc.

The replay stage suitably comprises a spindle motor arranged to rotate a received disc, a read head, and a scanning mechanism arranged to move the read head relative to the rotating disc under direction of the controller: the disc may be optical or magnetic and such a read head of the apparatus will be configured accordingly. The apparatus may further comprise user-operable input means coupled with said controller in response to the operation of which the relative motion between the head and disc may be varied. In such an arrangement, for one or more predetermined user-directed patterns of relative motion between head and disc said indicator subcodes may be read from the disc and, for all other user-directed patterns, the displayed indication may instead be based on said emulation model.

The or a predetermined user-directed pattern of relative motion may be such as to give a fixed replay rate for the recorded data, and user-directed patterns of motion other than said predetermined pattern or patterns may include those which would give a slower or faster replay rate than said fixed replay rate and/or a reverse direction of replay.

Where the data stored on the disc is encoded audio data, the apparatus may further comprise data processing means arranged to receive, decode, and output the same. In such an arrangement, the apparatus may be arranged to mute the output of the decoded audio at replay rates other than said fixed replay rate. The encoding may be in accordance with MPEG audio protocols or other data storage schemes, as will be readily understood.

As will be described with reference to preferred embodiments hereinafter, the emulation model may be provided by the controller maintaining a pointer within the table of contents to the item last read as indicated by the read indicator subcodes, and moving said pointer on the basis of time signal inputs, the user-directed pattern, and stored information for each item in the table of contents. In such an arrangement, where the stored information for each item in the table of contents includes a running time, the emulation model may specify elapsed running time for a current item as derived from a user-directed replay rate and direction and the last read indicator subcode.

As a further feature, the replay stage scanning mechanism may be controlled to periodically relocate the position of the read head relative to the disc on the basis of the emulation model, such that overall seek times during trick modes may be kept down.

Further features of the present invention are recited in the attached claims, the disclosure of which is incorporated herein by reference, and to which the readers attention is now directed.

BRIEF DESCRIPTION OF THE DRAWINGS

Preferred embodiments will now be described by way of example only, and with reference to the accompanying drawings in which.

DETAILED DESCRIPTION OF THE INVENTION

The following description considers in particular compact disc digital audio (CDDA) handling in A/V devices operating according to HQ-VCD protocols with four digital audio channels and MPEG-2 (ISO/IEC 13818) video, although the skilled practitioner will recognise the applicability of the present invention to other A/V coding schemes and protocols not in conformance with HQ-VCD and/or MPEG standards.

For an HQ-VCD player, a full range of play and seek directions and speeds for CDDA may not be supported. For normal play, the audio is decoded and played and CDDA subcodes (including time on the disc) are generated or read from the disc, but for all other speeds (such as forwards x2, x8 and backwards x1, x2, x8) it may not be possible to generate either the audio or the subcodes. However, in order that it appear to the user that the disc is being played at all speeds (even though the audio will be muted at other than normal playback) the present invention provides an emulator module which acts as a "virtual disc" as a source for the disc information when it is not available from the actual disc.

Figure 1:
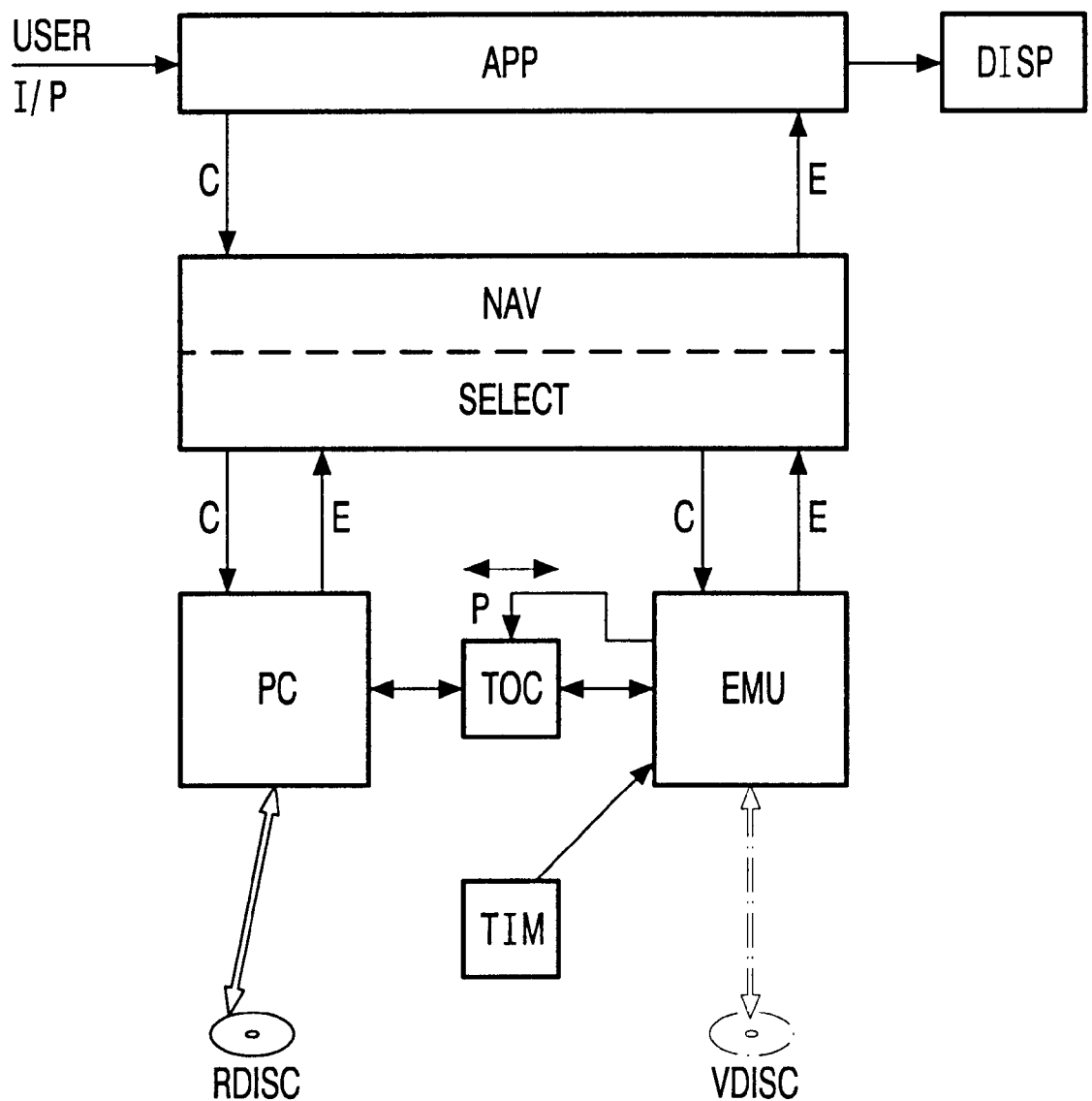
FIG. 1 is a block schematic representation of software and hardware modules in an optical disc record/replay apparatus embodying the invention.

FIG. 1 schematically illustrates the provision and operation of the virtual disc VDISC in relation to functional components of an optical disc audio system. During conventional play the audio is decoded and played from the real disc RDISC under the direction of a Presentation Control PC software utility and the subcodes indicating time on the disc, track number and so forth are generated. Coupled with the Presentation Control PC, via a selection function SELECT, is a CDDA navigation function NAV which is in turn coupled to a CDDA application APP. In operation, the navigation function NAV handles movement around the real disc RDISC under direction of the application APP which is effectively the user-interface component. The components APP, NAV, SELECT, PC and EMU (to be described) may be considered as layers in a software stack in one embodiment, with commands C being issued from software components at higher levels of the stack to those at lower levels, and those at the lower levels communicating with those above by means of propagation of events E. For example, the subcodes that contain track and time information, as decoded from the CDDA data stream, are passed to the navigator function NAV by means of events from the Presentation Control PC and then propagated to the application APP as further events.

Depending on the system hardware, for some speeds and directions (other than x1 forward, i.e. normal play) it is not possible to decode real subcodes from the disc, either due to physical considerations affecting the read operation from the disc, or because these speeds and/or direction are not supported by the presentation control PC. On determination that such a condition applies, the selection function SELECT at the lower end of NAV instead switches in an emulator module EMU at these times. The emulator EMU "plays" the virtual disc VDISC using a timer TIM and the table of contents TOC from the real disc. Whilst the audio is not replayed, the track and time listing display DISP is kept up to date, with a typical update for each second of real disc play time. Operationally, whilst the emulator EMU is active, a pointer P is generated to the item currently read from the TOC. By reference to the timer input TIM, the duration of the individual play items as recorded in the TOC, and the intended reading or scanning rate (as determined from the user input received by APP) the virtual disc VDISC and the appropriate subcodes for apparent play of the actual disc (the codes that would have been supplied as events from RDISC to PC) are generated in real time.

It is important that, if the user switches back to normal speed having played, for example, forwards at speed x2, the disc should start from the correct place with minimal lag. In order to achieve this, the emulator module EMU periodically generates seek commands for the read head in relation to the real disc RDISC such that, when normal playback is resumed, there is minimal delay in locating the chosen audio. These seek commands may, for example, be generated at the rate of one for each minute of apparent real disc playing time.

Figure 2:
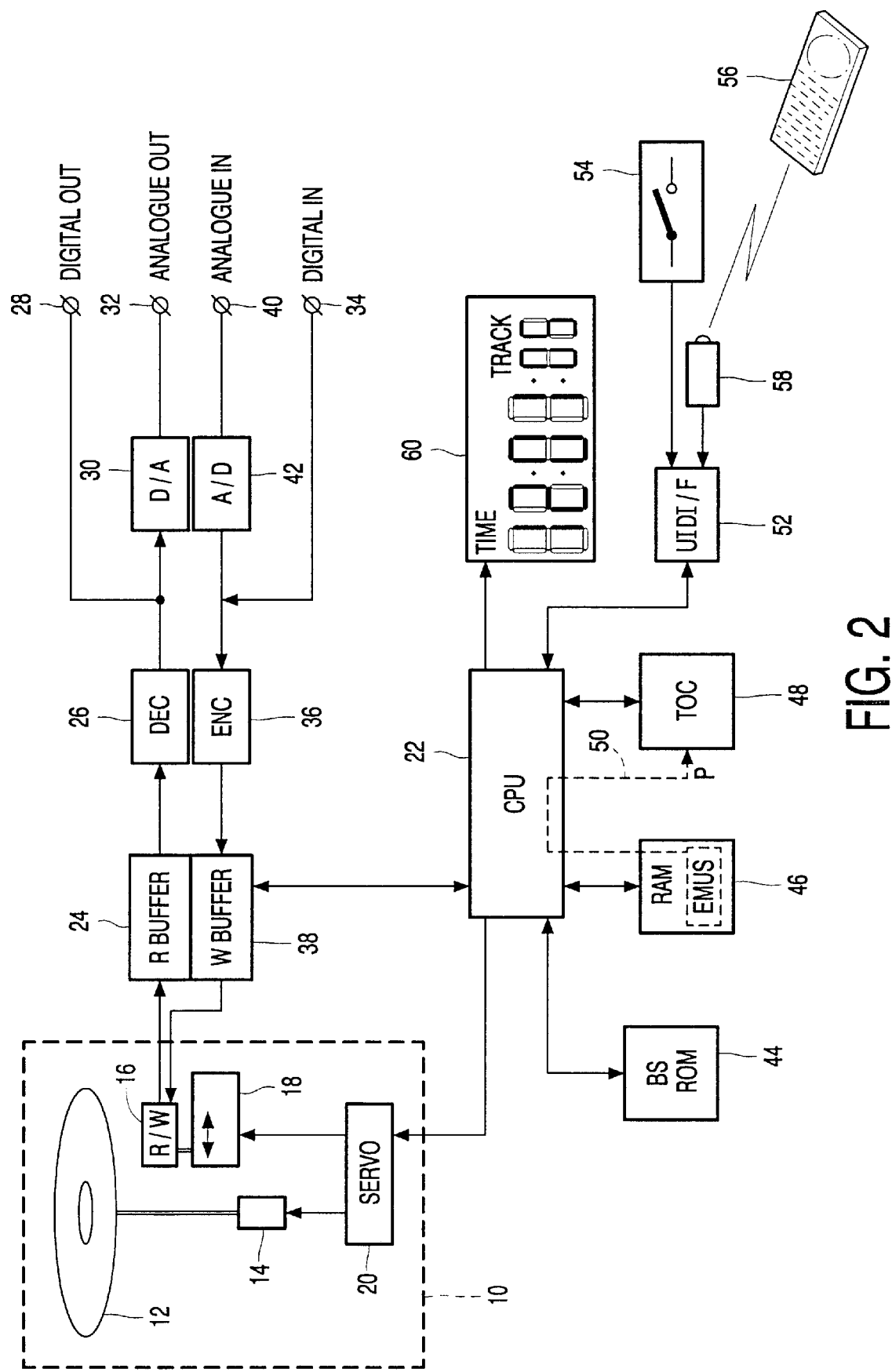
FIG. 2 is a more detailed schematic showing hardware components within the apparatus of FIG. 1.

The physical/hardware components of a disc reproduction apparatus suitable to embody the present invention will now be briefly described with reference to the block schematic diagram of FIG. 2. In many instances, the construction and/or controlled functions of the components is conventional and will be familiar to the skilled reader. Consequently, only those hardware features having a particular bearing on the operation of the present invention are described in detail.

The replay stage of the apparatus, indicated generally by dashed line 10, comprises conventional mechanical means for receiving a disc 12, together with a spindle motor 14 for rotation of the received disc 12. A read/write head 16 is moved back and forth across the disc 12 by tracking motor 18: as will be recognised, the particular form of the head 16 and its orientation relative to the disc 12 will depend on whether it is read-only or (as for this example) read/write capable, as well as the type of disc (optical or magnetic). The replay stage 10 concludes with a servo controller stage 20 which controls both the rotational speed of the spindle motor 14 and the linear speed of the tracking motor 18, under the direction of a central controller (CPU) 22 of the apparatus, such as to read data from (or write data to) a particular location on the disc 12 as identified by CPU 22, or to predictively move the head 16 on the basis of the emulator values as mentioned previously.

Data read from the disc 12 by read/write head 16 is initially buffered at 24 before being output to a decoder 26 and from there to an output 28 for digital audio or data. For analogue audio output, the signal from decoder 26 is passed through D/A converter 30 before passing to an analogue output 32. In a similar arrangement, digital data or audio for recording is received on input 34 and passed via encoder stage 36 and write buffer 38 en route to the read/write head 16. For analogue audio, a separate analogue input 40 is provided with the signals being passed through A/D converter 42 before reaching the encoder 36.

The CPU 22 is coupled with one or more random access and read-only memory devices including bootstrap ROM 44 containing the basic start up functions and operating system for the CPU 22, working RAM 46, and a local cache 48 to hold the table of contents TOC read from the disc 12. The working RAM 46 holds, amongst other values, the generated subcode values EMUS which, as illustrated by dashed line 50, enable the CPU 22 to maintain the pointer P to the apparent read location in the TOC during operation of the emulator.

Also coupled to the CPU 22 is an interface 52 for the various user input means provided, including device controls 54 (volume controls, push buttons for programmed play operation and so forth) built into the unit, and remote controls 56 coupled by infra-red link to IR receiver 58 coupled with the interface 52. Finally, there is a display 60 the particular configuration of which may vary from a simple LED or LCD display for track number and elapsed time (as shown) to a larger and more complex device, perhaps a separate monitor or CRT screen. Whatever the particular configuration, however, the display 60 is coupled to the CPU 22 and displays information relating to the playback or search operation across the disc 12, with the subcodes for generation of this information being created from the virtual disc (VDISC; FIG. 1) when they are not available from the real disc.

A technique has been described for allowing the emulation of multiple disc replay speeds in apparatuses which do not support such speeds, with low latency for switching between emulated and real speeds. From reading the present disclosure, other variations (including conformance or otherwise with other optical or magnetic disc recording standards) will be apparent to persons skilled in the art. Such variations may involve other features which are already known in the field of apparatuses for replaying of audio and/or video signals and component parts thereof and which may be used instead of or in addition to features already described herein.

What is claimed is:

1. Disc reproduction apparatus comprising:
   a disc replay stage operable to receive a disc and read data stored thereon;
   a controller coupled with the replay stage and a first storage means holding a table of contents for a received disc;
   a display coupled to the controller, with the controller being configured to generate and periodically update for display an indication of data currently being read from a received disc based on indicator subcodes read from the disc and the table of contents; and
   a time signal source coupled to the controller and the controller is arranged to generate and update an emulation model of a disc being read based at least partially on the table of contents and the time signal with the displayed indication of data being based instead on said emulation model when the indicator subcodes are unavailable.

2. Apparatus as claimed in claim 1, wherein:
   the replay stage comprises a spindle motor arranged to rotate a received disc, a read head, and a scanning mechanism arranged to move the read head relative to the rotating disc under direction of the controller; and
   the apparatus further comprising user-operable input means coupled with said controller in response to the operation of which the relative motion between the head and disc may be varied.

3. Apparatus as claimed in claim 2, wherein for one or more predetermined user-directed patterns of relative motion between head and disc said indicator subcodes are read from the disc, and for all other user-directed patterns, the displayed indication is based on said emulation model.

4. Apparatus as claimed in claim 3, wherein one of the predetermined user-directed patterns of relative motion or another predetermined user-directed pattern of relative motion is such as to give a fixed replay rate for the recorded data.

5. Apparatus as claimed in claim 4, wherein user-directed patterns of motion other than said predetermined pattern or patterns include those which would give a slower or faster replay rate than said fixed replay rate.

6. Apparatus as claimed in claim 4, wherein user-directed patterns of motion other than said predetermined pattern or patterns include those which would give a reverse direction of replay.

7. Apparatus as claimed in claim 4, wherein the data stored on the disc includes encoded audio data and the apparatus further comprises data processing means arranged to receive, decode, and output the stored data.

8. Apparatus as claimed in claim 7, wherein the apparatus is arranged to mute the output of the decoded audio at replay rates other than said fixed replay rate.

9. Apparatus as claimed in claim 3, wherein said emulation model is provided by the controller maintaining a pointer within the table of contents to the item last read as indicated by the read indicator subcodes, and moving said pointer on the basis of time signal inputs, the user-directed pattern, and stored information for each item in the table of contents.

10. Apparatus as claimed in claim 9, wherein the stored information for each item in the table of contents includes a running time, and the emulation model specifies elapsed running time for a current item as derived from a user-directed replay rate and direction and the last read indicator subcode.

11. Apparatus as claimed in claim 2, wherein the replay stage scanning mechanism is controlled to periodically relocate the position of the read head relative to the disc on the basis of the emulation model.

12. Apparatus as claimed in claim 1, wherein the stored data represents audio signals and is encoded in accordance with MPEG audio protocols.

13. Apparatus as claimed in claim 1, wherein the storage device is an optical disc.

14. Apparatus as claimed in claim 1, wherein the storage device is a magnetic disc.

* * * * *